United States Patent [19]
Whittenberger

[11] Patent Number: 5,146,744
[45] Date of Patent: Sep. 15, 1992

[54] ELECTRICALLY HEATABLE CATALYTIC CONVERTER INSERT

[75] Inventor: William A. Whittenberger, Garrettsville, Ohio

[73] Assignee: W. R. Grace & Co.-Conn., New York, N.Y.

[21] Appl. No.: 669,110

[22] Filed: Mar. 13, 1991

[51] Int. Cl.⁵ .............................................. E01N 3/28
[52] U.S. Cl. ...................................... 60/300; 422/174
[58] Field of Search ............... 60/300, 299; 422/174, 422/180

[56] References Cited

U.S. PATENT DOCUMENTS

| | | | |
|---|---|---|---|
| 3,142,150 | 7/1964 | Pearlman | 60/300 |
| 3,723,070 | 3/1973 | Houdry | 23/288 F |
| 3,768,982 | 10/1973 | Kitzner | 23/288 F |
| 3,770,389 | 10/1973 | Kitzner | 23/288 F |
| 3,857,680 | 12/1974 | Porta et al. | 23/288 K |
| 3,886,739 | 6/1975 | Lee | 60/286 |
| 3,889,464 | 6/1975 | Gardner | 60/286 |
| 3,916,057 | 10/1975 | Hatch . | |
| 3,992,330 | 11/1976 | Noakes | 252/466 J |
| 4,015,566 | 4/1977 | Wahl | 123/117 R |
| 4,023,928 | 5/1977 | Haensel | 21/74 R |
| 4,029,974 | 6/1977 | Brokaw | 307/296 R |
| 4,078,379 | 3/1978 | Minami et al. | 60/276 |
| 4,102,127 | 7/1978 | Saiki et al. | 60/284 |
| 4,186,172 | 1/1980 | Scholz | 422/180 |
| 4,272,668 | 6/1981 | Johnson et al. | 219/375 |
| 4,277,442 | 7/1981 | Hergart | 422/119 |
| 4,381,590 | 5/1983 | Nonnenmann | 29/157 |
| 4,414,023 | 11/1983 | Aggen et al. | 75/124 |
| 4,598,063 | 7/1986 | Retallick | 502/439 |
| 4,693,078 | 9/1987 | Dettling et al. | 60/295 |
| 4,702,892 | 10/1987 | Betz | 422/171 |
| 4,711,009 | 12/1987 | Cornellison et al. | 29/157 |
| 4,847,966 | 7/1989 | Kuchelmeister | 29/157 |
| 4,852,530 | 8/1989 | John | 123/145 A |
| 4,928,485 | 5/1990 | Whittenberger | 60/299 |
| 4,976,929 | 12/1990 | Cornelison | 60/300 |

FOREIGN PATENT DOCUMENTS

WO89/10470 11/1989 Fed. Rep. of Germany .
WO89/10471 11/1989 Fed. Rep. of Germany .

OTHER PUBLICATIONS

"Recent Developments in Electrically Heated Metal Monoliths" Whittenberger et al., SAE Technical Paper Series 900503 Feb. 26, 1990.
Analog Devices: "Thermocouple Conditioner and Set-Point Controller" AD596/AD597.
Motorola Semiconductor Technical Data MC68H811A2.
Abstract of DE3446342-A Jun. 26, 1986.
Abstract DE3731888 A Apr. 13, 1989.
Allied Metglas Products—Catalogue Sheet.

Primary Examiner—Douglas Hart
Attorney, Agent, or Firm—Edward J. Cabic

[57] ABSTRACT

There is provided an electrically heatable catalytic converter insert for insertion in a current internal combustion engine exhaust line. The device described includes a housing and a polycellular corrugated thin metal foil monolith disposed therein, and having a central core. The monolith includes a noble metal catalyst disposed of the inner surface of the cells. There are also provided a positive terminal and a negative terminal for attachment to a voltage source. The positive terminal is attached to the central core, and the negative terminal is attached to the housing, the foil providing a heatable resistance member enabling heating of the device by electrical power. The positive and negative terminals are electrically insulated from each other and each has a radially projecting arm for attachment of cables from a voltage source.

12 Claims, 3 Drawing Sheets

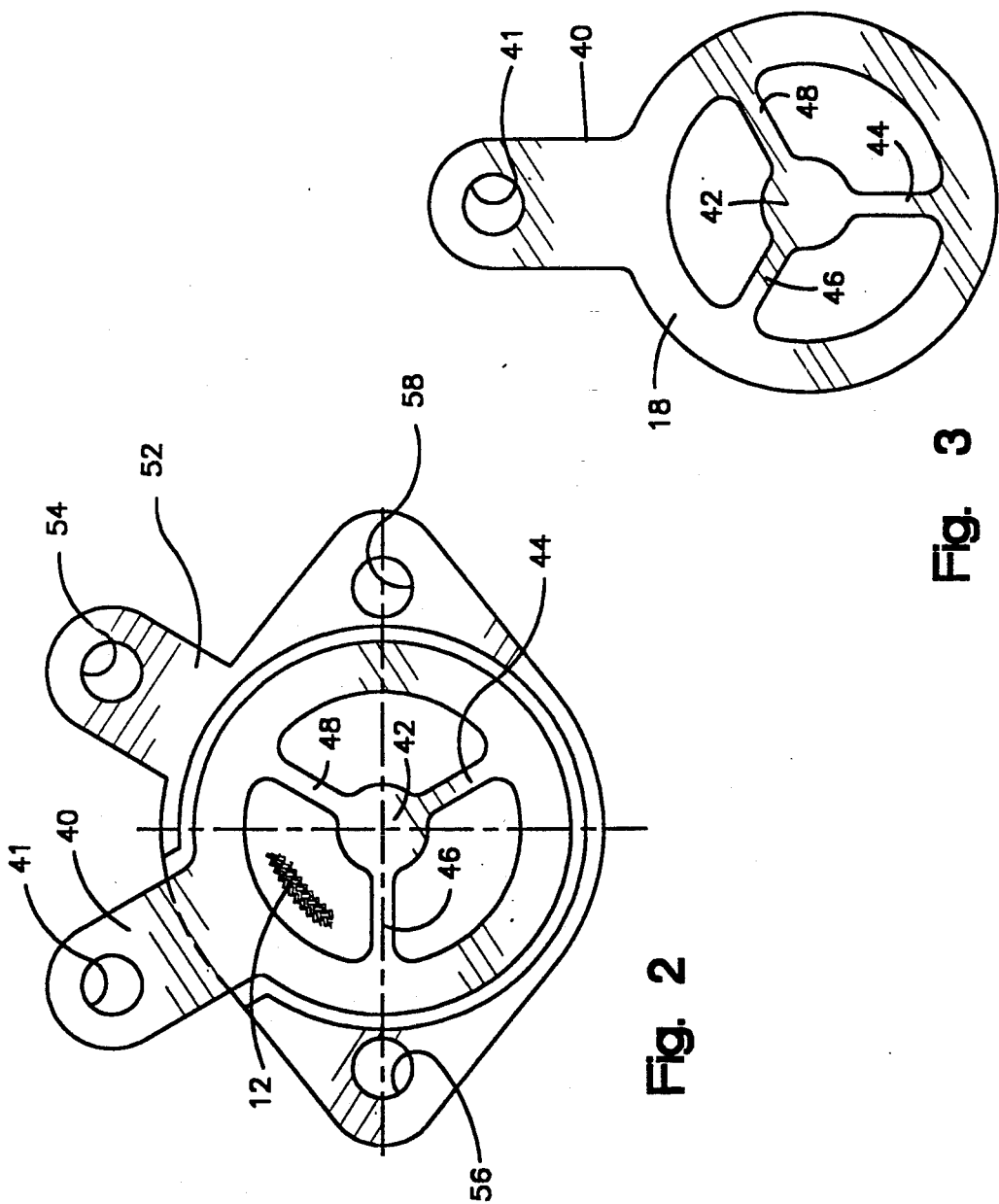

ELECTRICALLY HEATABLE CATALYTIC CONVERTER INSERT

The present invention relates to an electrically heatable catalytic converter insert for insertion in an exhaust line from an internal combustion engine. More particularly, the invention relates to an electrically heatable catalytic converter which is adapted to be inserted in an existing exhaust line by severing the exhaust line, applying suitable attachment means, e.g., flanges, to the cut ends, inserting the electrically heatable unit, and bolting or otherwise clamping the attachment means to retain the electrically heatable unit in place. The unit is readily removable and replaceable should the need for repair or replacement arise.

BACKGROUND OF THE INVENTION AND PRIOR ART

The purpose of a catalytic converter is to convert pollutant materials in engine or turbine exhaust gas streams, e.g., carbon monoxide, unburned hydrocarbons, nitrogen oxides, etc., to carbon dioxide, nitrogen and water. Conventional catalytic converters utilize a ceramic honeycomb monolith having square, circular, or triangular straight-through openings or cells with a catalyst or catalysts deposited on the walls of the cells, catalyst coated refractory metal oxide beads, e.g., alumina beads, or a corrugated thin metal foil monolith, e.g., ferritic stainless steel foil, having catalyst material carried on or supported by the surface. The catalyst is normally a noble metal, e.g., platinum, palladium, rhodium, ruthenium, or a mixture of two or more of such metals. The catalyst catalyzes a chemical reaction, mainly oxidation, whereby the pollutant is converted to a harmless by-product which then passes through the exhaust system to the atmosphere.

However, conversion is not efficient initially when the exhaust gases and the catalyst are each relatively cold. To be effective, the catalyst and the surface of the converter with which the gases come in contact must be at a minimum temperature, e.g., 390 F. for carbon monoxide, 570 F. for volatile organic compounds (VOC) and 1000 F. for methane or natural gas. Otherwise, conversion to harmless byproducts is poor and cold start pollution of the atmosphere is high. Once the exhaust system has come to its operating temperature, the catalytic converter is optimally effective. Hence, it is necessary to contact relatively cold exhaust gases with hot catalyst in order to effect satisfactory conversion at engine start-up. Both compression ignited (diesel) and spark ignited internal combustion engines have this need.

To accomplish this pre-ignition heat up, electrically heatable catalytic converters have been developed. These are connected to the engine voltage source, e.g., at 12 volt to 60 volt battery-alternator power supply system. Reference may be had to copending commonly owned application Ser. No. 587,219 filed Sep. 24, 1990 in the names of William A. Whittenberger and Richard C. Cornelison for disclosure of a suitable electrically heatable catalytic converter and power means for heating it. Thee power means are useful in the present invention to provide the requisite power for rapid and repeatable heating to an optimum light-off temperature (650 F. to 750 F.) of the electrically heatable catalytic converter in a minimum amount of time, e.g., 2 to 30 seconds. The electrically heatable catalytic converter (EHC) effectively jump starts the temperature in the exhaust in order to trigger the light-off of the pollutants and utilize latent chemical energy. Reference may also be had to the patents to Kitzner, U.S. Pat. Nos. 3,768,982 and 3,770,389 each dated Oct. 30, 1973 which disclose electrically heated catalytic converters.

Reference may also be had to International PCT publication numbers WO 89/10470 and 10471 filed Nov. 2, 1989. These disclose electrically heatable catalytic converters useful in automobiles.

Reference may also be had to U.S. Pat. No. 4,711,009 dated Dec. 8, 1987 and issued to Cornelison et al which provides details for the preparation of polycellular corrugated thin metal (ferritic stainless steel) monoliths having a catalyst deposited on the surface, which process may be used in the fabrication of the present devices.

The present invention solves a problem which exists in after market vehicles, for example, and which, for the most part, are equipped with ceramic core catalytic converters as mentioned above. With the ever tightening rules by states, e.g., Calif., there is a great need for a simple device for retrofitting such automobiles with an electrically heatable catalytic converter in the same exhaust line already containing a conventional ceramic core catalytic converter. Such device must be dimensioned and configured to fit within the standard exhaust lines, for example, those used on passenger automobiles. These have a diameter on the average of 2.5". Flanges for such exhaust pipes are currently available, and the devices hereof should be clampable between such flanges fitted over the severed ends of the exhaust pipe. For Diesel engines, a larger diameter, up to 6 inches or more, may be used. Thus, by cutting the exhaust pipe, ahead of or after the conventional catalytic converter, attaching, e.g., by welding, standard exhaust pipe flanges, and inserting a device of the present invention, current automobiles may be retrofitted with an electrically heatable catalytic converter to enable reduction in the production of pollutant materials at, for example, start-up. Alternatively, these devices may be attached to the engine directly in the exhaust conduit leading from the cylinder to the manifold, one for each cylinder. Depending on size and space constraints, these devices may be from about 2" to about 8" long. Thus, these devices can be used for retrofitting current vehicles. They can also be used to replace worn out devices. More over, because of their easy replaceability, the devices can be made intentionally smaller and less expensive, and designed for periodic replacement as needed.

BRIEF STATEMENT OF THE INVENTION

Briefly stated, the present invention is an electrically heatable catalytic converter for insertion in an exhaust line from an internal combustion engine comprising a catalyst bearing corrugated thin metal honeycomb unit dimensioned and configured for fitting within said exhaust line, said honeycomb having (a) a metallic central core in electrical contact with (b) at least one corrugated thin metal strip wrapped about said core; (c) a peripheral metal housing in electrical contact with the other end of said at least one corrugated thin metal strip; (d) a metallic member attached to said central core and having lug means for attaching one pole of a voltage source; and (e) a metallic member attached to said peripheral metal housing and having lug means for attaching the other pole of said voltage source; said members (d) and (e) being electrically isolated from each other, and at least one of said members (d) and (e) being electrically isolated from said peripheral housing. In more specific embodiments, the corrugated thin metal is configured thin ferritic stainless steel. The corrugated thin ferritic stainless steel may desirably have a wash coating of alumina (gamma) on the surface and a noble metal catalyst metal deposited thereon.

BRIEF DESCRIPTION OF THE DRAWINGS

The invention may be better understood by having reference to the annexed drawings showing a preferred embodiment of the invention (best mode) and wherein:

FIG. 2 is a cross-sectional view of the device of FIG. 1 as it appears in the plane indicated by the line 2—2 in FIG. 1.

FIG. 3 is a plan view of the positive terminal.

FIG. 4 is a cross-sectional view of the terminal of FIG. 3.

DETAILED DESCRIPTION OF THE EMBODIMENT IN THE DRAWINGS

As indicated above, the present invention contemplates an electrically heatable catalytic converter which is dimensioned and configured to fit within a conventional exhaust line. Exhaust lines in common use at this time on passenger automobiles are circular and 2.5" in diameter. Exhaust lines on diesel engines are generally larger, being 3.5" to 6" in diameter for over the road trucks, for example, and much larger for locomotive diesel-electric engines. In any such case, the final or maximum diameter of the present devices is desirably such that it can be inserted into the existing exhaust line. The device itself including the housing may be from about 2 to about 8 inches in length depending on dimensional constraints and on stability (e.g., resistance to telescoping) requirements.

Basically, the devices of the present invention comprise a corrugated thin metal monolith, preferably stainless steel foil from about 0.001" to about 0.005" thick and about 2" to about 8" wide in the form of a cylinder from 1.5" to 12" in diameter and from 2" to 8" in axial dimension, and in a stainless steel or nickel housing. The outer diameter is such that it will fit snuggly although slidably within a conventional engine exhaust line. The hollow central core of the monolith is made of metal such as stainless steel or nickel closed at at least one end, and plugs the hollow central portion to prevent exhaust gas from otherwise escaping through that route. This structure is desirably a closed circular tubular member which conducts electricity. There are also provided a positive terminal member having a projecting lug for attachment of one pole from a voltage source, and a negative terminal member having a projecting lug for attachment of the negative pole from a voltage source, such as a car battery. These poles, as will be shown below are eclectically isolated from each other, and the positive pole or terminal isolated from all but the central core. If, as is the preferred case, the polycellular gas permeable monolith is a spiraliform roll of herringbone or chevron corrugated ferritic stainless steel foil, the current will flow from the positive central core through the length of the spiralcoil to the negative outer housing causing the coil to become heated electrically. The spiraliform roll may be a composite of a corrugated thin metal strip using straight through corrugations and a flat metal strip. However, such a composite structure is not preferred for cost and back-pressure reasons. The devices hereof may be of any geometric cross-section, e.g., circular or oval. For convenience, the invention will be described in respect a device having a circular cross-section.

Figure 1:
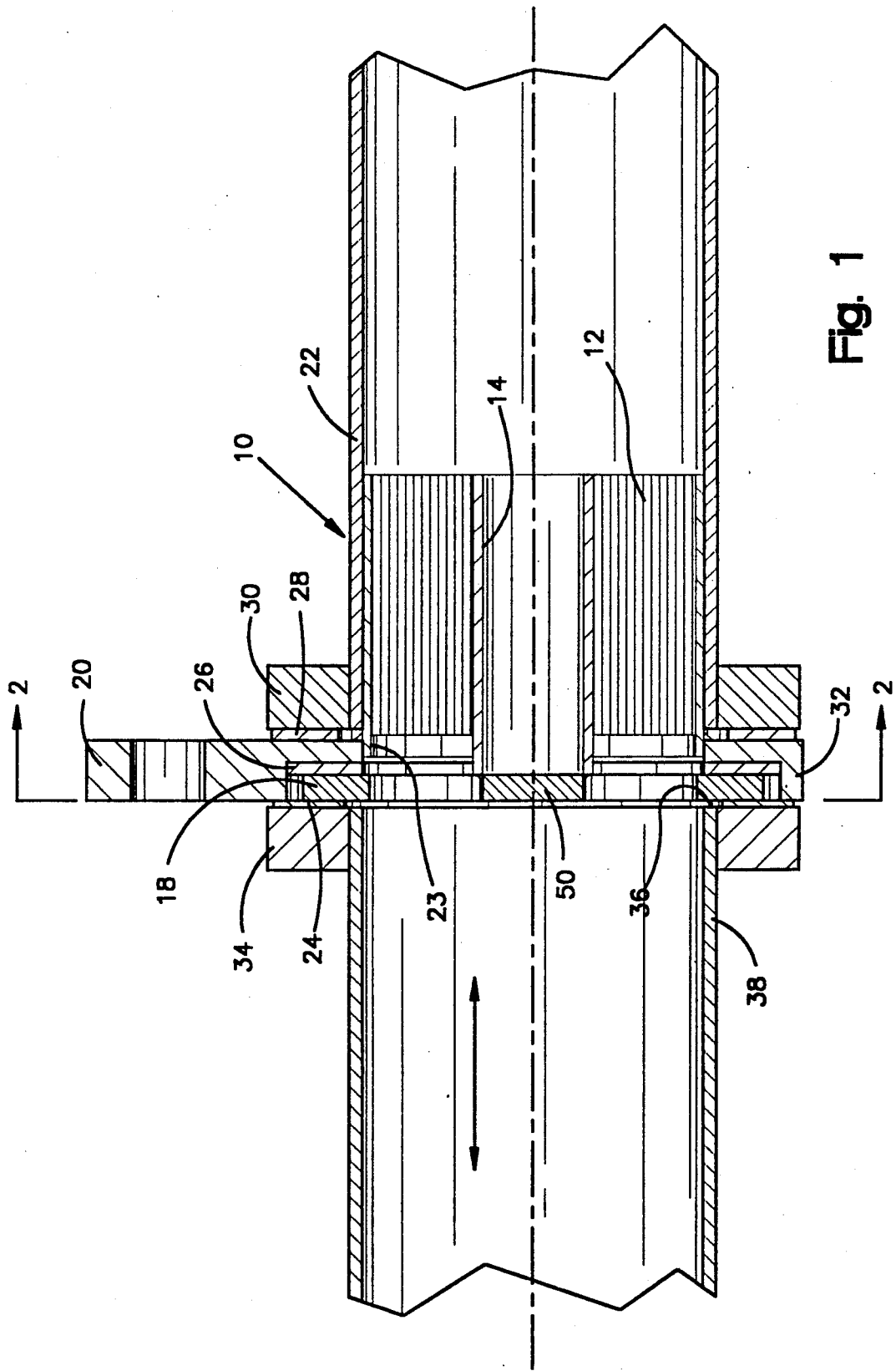
FIG. 1 is a cross-sectional view of an insertable electrically heatable catalytic converter in place in an exhaust line with the negative terminal rotated to the vertical for better visibility.

Referring now, more particularly, to the annexed drawings, there is shown in cross-section in FIG. 1 an exhaust pipe 38 containing an insertable electrically heatable catalytic converter, generally indicted at 10. The catalytic converter 10 is formed of a corrugated thin ferritic stainless steel foil monolith 12 having a wash coat of alumina (gamma) on at least one surface of the foil, preferably both surfaces, and having a noble metal catalyst deposited thereon. The foil monolith is contained in a housing 22 to which the polycellular monolith may be attached as by brazing or welding. A process for the preparation of the corrugated thin metal foil, applying the wash coat of alumina (gamma), and application of the catalyst is described in U.S. Pat. No. 4,711,009, supra. The foil may be spot welded or brazed at one end to the central core member 14 and then spirally wound about the central core member 14 which is closed by suitable plug 50 or cap 50 at one end. The free end of the corrugated thin metal strip is welded or brazed to the housing 22. Other means of building up the corrugated thin metal monolith 12 may be used such as, for example, that described in copending commonly owned patent application Ser. No. 587,219 filed Sep. 24, 1990 by Richard C. Cornelison and William A. Whittenberger, and that described in copending commonly owned patent application Ser. No. 626,672 field Dec. 12, 1990 by William A. Whittenberger. The housing 22 is provided with a projecting rim 23 extending axially from the polycellular monolith 12 a distance at least equal to the width of the negative terminal 20. The rim 23 is welded or brazed to the I.D. of the negative terminal 20. The monolith 12 has a cell density of from 100 to 450 cells per square inch, e.g., 150 cells per square inch and has an open area of from about 70% to about 90%.

The corrugations are desirably of herringbone or chevron configuration, the sides of the chevron or herringbone pattern having a slope of from about 3 to about 10 degrees to a line perpendicular to the edges of the foil strip. The corrugations have pitch of from about 0.02" to about 0.2" and an amplitude of from about 0.02" to about 0.25". The cross-sectional pattern of an individual corrugation is desirably generally sinusoidal or triangular in which the apices of the triangle have been rounded. Such a herringbone or chevron pattern prevents nesting of contiguous convolutions of a spirally wound monolith, or nesting of contiguous reaches of an overfolded corrugated thin metal strip such as disclosed in the aforesaid Ser. No. 587,219.

Figure 6:
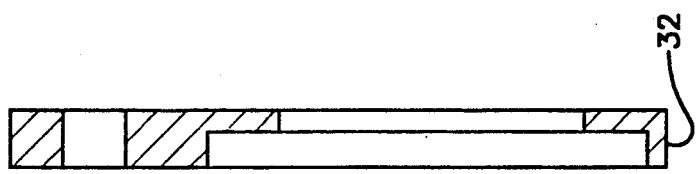
FIG. 6 is a cross-sectional view of the terminal of FIG. 5.
Figure 5:
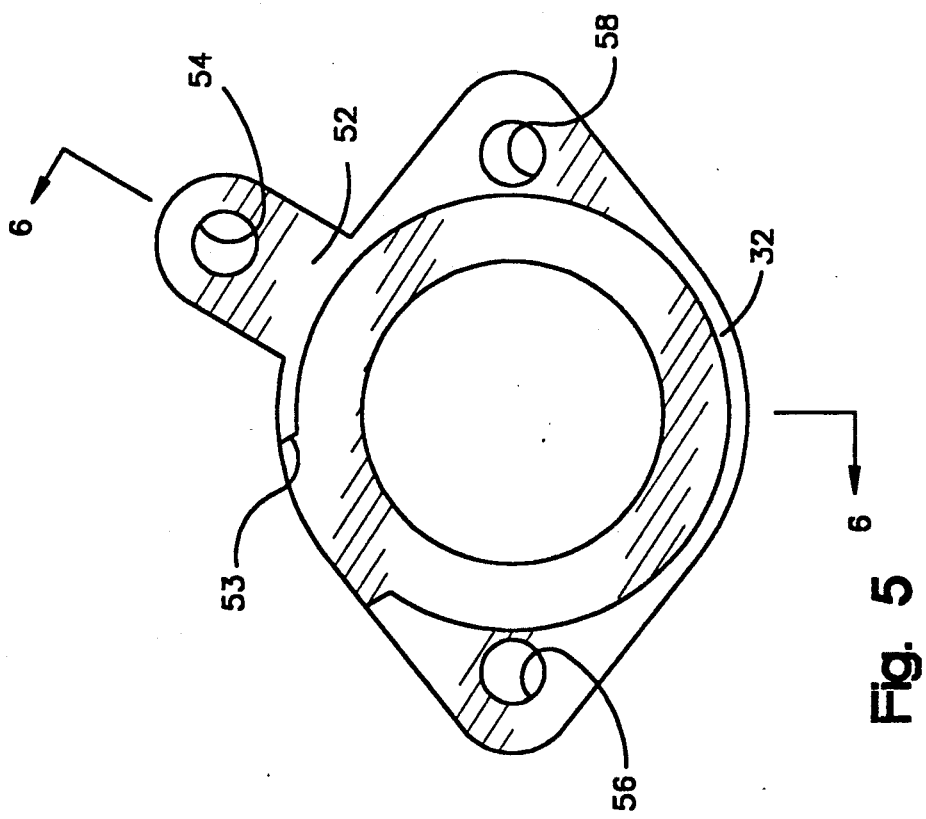
FIG. 5 is a plan view of the negative terminal.

To conduct electrical power to the device 10, there is provided a positive terminal or electrode 18 having a generally annular configuration with a generally circular outer periphery, which is secured in electrical contact (as by welding) to the central core 14 (See FIGS. 3 and 4 for details), and a negative terminal or electrode 20 having an outer periphery like that of a conventional exhaust pipe flange, which is secured in electrical contact (as by welding) to the axially projecting rim 23 of the housing 22 which surrounds and contains the monolith 12 (See FIGS. 5 and 6 for details). A convenient way to secure the housing 22 to the monolith 12 is to wrap the monolith 12 in a brazing foil, insert it into the hosing shell 22, and fuse the brazing foil by induction heating to a fusion temperature for the foil, e.g., about 2150 F. Induction heating is preferred to avoid overheating and damaging the catalyst A suitable brazing alloy fusing at about 2150 F. analyzes 19.0% Chromium, 7.3% Silicon, 0.08% Carbon 1.5% Boron, balance Nickel. High fusion temperature is desired due to the environment in which the device 10 operates to avoid softening of brazed joints in use.

Alternatively, application of the catalyst to the monolith can be deferred until all brazing has been done, and then applied by dipping the assembled unit in a catalyst solution followed by heating to reduce the catalyst compound to the metal.

The positive and negative electrodes must be electrically isolated or insulated from one another, and the positive electrode isolated or insulated from the exhaust pipe 38 or engine chassis (not shown( which is usually at a negative potential as in an automotive passenger vehicle, for example. To this end, as shown in FIG. 1, there are provided nonmetallic insulation gaskets 24, 26 and 28, e.g., ceramic fiber gaskets, or conventional exhaust pipe gaskets currently available at automotive parts stores. Gasket 26 is better shown in FIG. 7 and is provided with a projecting tab 27 to better insulate the positive and negative terminals. The negative terminal 20 abuts on the downstream side, an insulation gasket 28 having the shape of an adjacent exhaust pipe flange 30, a standard item for exhaust lines. The flange 30 is welded to thee exhaust pipe at the time of installation of the device 10. To isolate electrically the negative terminal or electrode 20 from the positive electrode or terminal 18, there is provided an insulation gasket 26. A third gasket 24 also insulates the spacer flange 32 on the negative terminal 20 from the positive terminal 18. The gasket 24 abuts a second exhaust pipe flange 34 which like the flange 30 is welded at the severed end 36 of the exhaust pipe 38.

As shown in FIG. 2, which is an end view of the electrodes or terminals 18 and 20 as they appear in the plane indicated by the line 2—2 in FIG. 1, each of the electrodes 18 and 20 is provided with a lug. Thus, lug 40 is provided on and projects radially outwardly from the electrode body 18. The body 18 also includes a central plate 42 supported by radial arms 44, 46 and 48. The central plate 42 is generally circular in shape and has a diameter sufficient to cover and plug the O.D. of the central core 14 which should be closed at at least one end. A metallic button 50 (FIG. 1) is interposed between the central plate 42 and the central core 12 and displaces the plane of the core beyond the rim 23 a distance equal to the thickness of the insulating gasket 26 whereby the button 50 and the terminal 18 are brought into abutting relation. The button 50, the central plate 42 and the central core 12 are welded together in superposed relation for good electrical contact. Note that the lug 52 on the negative electrode 18 has been rotated 45 degrees in FIG. 1 for visibility purposes. The lug 40 has a hole 41 for attachment of a cable from the positive pole of the voltage source, e.g., a 12 to 60 volt battery system.

Figure 7:
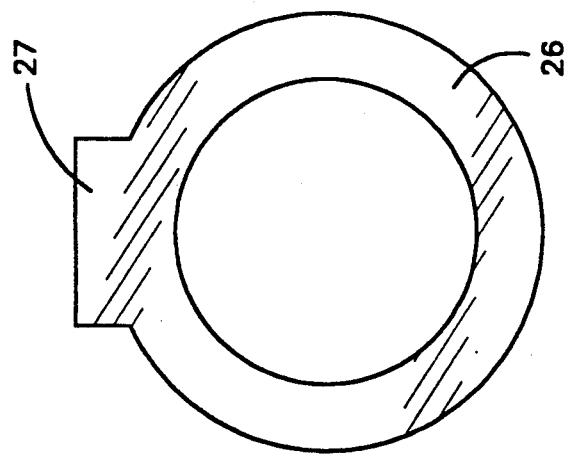
FIG. 7 is a plan view of an insulator having the shape of an annulus and having a tab thereon projecting from the outer periphery thereof for insulating the positive terminal from the negative terminal.

As shown in FIG. 5 the rim 32 of the negative terminal has a gap 53 to allow for nesting of the positive lug 40, albeit insulated from the negative terminal by the intermediate insulator 26 shown in FIGS. 7 and 1.

The negative terminal or electrode 20 is provided with a radially outwardly projecting lug 52 also provided with a hole 54 for attachment of a cable from the negative pole of the voltage source or battery. The lug 52 is disposed circumferentially from the location of the lug 40 to facilitate attachment of cables from the voltage source. Direct cables from the electrical power source to the device 10 are preferred to minimize power losses and shorten heatup time. A power control system utilizing metal oxide semiconductor field effect transistors (MOSFET) as described in copending application Ser. No. 587,219, supra, is desirably used in connection with the deices 10 hereof to enable the application of a large amount of power from the voltage source over a period of time of from 2 to 30 seconds for rapid heating of the electrically heatable catalytic converter to the desired catalyst temperature.

Bolts (not shown) extend through holes 56 and 58 in both pipe flanges 30 and 34 to compress and retain the assembly in the condition shown in FIG. 1.

FIGS. 3 and 4 show in plan and cross-sectional view, respectively, the details of the positive electrode or terminal 18. This electrode 18 is conveniently made of nickel and is from about ⅛" to about 3/16" thick.

FIGS. 5 and 6 show in plan and cross-sectional view, respectively, the details of the negative electrode or terminal 20. The negative terminal or electrode 20 has, for the main body thereof, the configuration of the exhaust pipe flanges 30 and 34 and includes, therefore, bolt holes 56 and 58 to accept the flange bolts (not shown) that hold the entire assembly in tightly compressed relation. Also shown in FIG. 6 is a recess 31 in the terminal 20 which is dimensioned lager than the diameter of the periphery of the positive terminal 18 and is adapted to receive the terminal 18 as shown in FIG. 1.

FIG. 7 is a plan view of an insulator 26 having a tab 27 thereon for use between the positive electrode 18 and the negative electrode 20.

Exhaust gas may flow in either direction through the devices hereof, although in the preferred case, the gas flows from left to right as shown in FIG. 1.

There has thus been provided an electrically heatable catalytic converter insert useful for updating current exhaust line catalytic systems so as to reduce emission of pollutants, particularly at the time of startup. These devices may be readily inserted in current exhaust equipment by severing the exhaust line ahead of (preferably) or behind the current catalytic converter, applying suitable flanges, inserting the unit of the present invention into the exhaust pipe, and bolting the resulting assembly together.

What is claimed is:

1. An electrically heatable catalytic converter insert for insertion in an exhaust line from an internal combustion engine comprising a catalyst bearing corrugated thin metal polycellular honeycomb monolith dimensioned and having a circular configuration for placement within an exhaust line, said insert having a metallic central core; (b) at least one corrugated thin metal strip wrapped about said central core and having one end thereof in electrical contact therewith; (c) a peripheral metal housing in electrical contact with the other end of said at least one corrugated thin metal strip; (d) a first metallic terminal member attached to said central core and having an annular configuration, and having lug means projecting from the outer periphery for connecting to one pole of a voltage source; (e) a second metallic terminal member having a central opening and having lug means projecting from the outer periphery thereof for connecting to the other pole of the voltage source; said members (d) and (e) being electrically isolated from each other, and at least one of said members (d) and (e) being electrically isolated from said peripheral housing.

2. An electrically heatable catalytic converter insert in accordance with claim 1 wherein the corrugated thin metal honeycomb is spirally wrapped around said central core.

3. An electrically heatable catalytic converter insert in accordance with claim 1 wherein the corrugated thin metal strip has a coating of gamma alumina on the surface thereof.

4. An electrically heatable catalytic converter insert in accordance with claim 3 wherein gamma alumina coating has a noble metal catalyst deposited thereon.

5. An electrically heatable catalytic converter insert in accordance with claim 4 wherein the noble metal catalyst is selected from the group consisting of platinum, palladium, rhodium, ruthenium, and mixtures of two or more of such metals.

6. An electrically heatable catalytic converter insert in accordance with claim 1 wherein the corrugated thin metal strip is a corrugated thin stainless steel strip.

7. An electrically heatable catalytic converter insert in accordance with claim 6 wherein the corrugated thin stainless steel strip is a thin corrugated ferritic stainless steel strip.

8. An electrically heatable catalytic converter insert in accordance with claim 1 wherein the metallic terminal members are nickel.

9. An electrically heatable catalytic converter insert in accordance with claim 1 wherein the peripheral metal housing is nickel.

10. An electrically heatable catalytic converter as defined in claim 1 wherein the corrugations are in a herringbone or chevron pattern.

11. An electrically heatable catalytic converter insert in accordance with claim 1 wherein the terminal members are isolated from each other by ceramic insulation means.

12. An electrically heatable catalytic converter insert in accordance with claim 1 wherein said second terminal member (e) has a circular recess in the face thereof dimensioned and configured to receive said first terminal member.

* * * * *